United States Patent
Nieminen

(10) Patent No.: US 9,702,498 B2
(45) Date of Patent: Jul. 11, 2017

(54) METHOD AND SYSTEM FOR MANUFACTURING INSULATION BLOCK AND INSULATION BLOCK

(71) Applicant: FinnFoam Oy, Salo (FI)

(72) Inventor: Henri Nieminen, Salo (FI)

(73) Assignee: FINNFOAM OY, Salo (FI)

( * ) Notice: Subject to any disclaimer, the term of this patent is extended or adjusted under 35 U.S.C. 154(b) by 341 days.

(21) Appl. No.: 14/391,681

(22) PCT Filed: Apr. 11, 2013

(86) PCT No.: PCT/FI2013/050400
§ 371 (c)(1),
(2) Date: Oct. 9, 2014

(87) PCT Pub. No.: WO2013/153285
PCT Pub. Date: Oct. 17, 2013

(65) Prior Publication Data
US 2015/0064436 A1 Mar. 5, 2015

(30) Foreign Application Priority Data
Apr. 11, 2012 (FI) ....................... 20125394

(51) Int. Cl.
| | |
|---|---|
| B29C 43/02 | (2006.01) |
| B29C 44/58 | (2006.01) |
| B29C 67/20 | (2006.01) |
| F16L 59/02 | (2006.01) |
| B29C 44/34 | (2006.01) |
| B29K 101/12 | (2006.01) |

(52) U.S. Cl.
CPC ............ *F16L 59/021* (2013.01); *B29C 43/02* (2013.01); *B29C 44/352* (2013.01); *B29C 44/585* (2013.01); *B29K 2101/12* (2013.01)

(58) Field of Classification Search
None
See application file for complete search history.

(56) References Cited

U.S. PATENT DOCUMENTS

| | | | |
|---|---|---|---|
| 3,504,068 A | 3/1970 | Zizlsperger et al. | |
| 3,640,787 A | 2/1972 | Heller | 156/77 |
| 3,642,400 A * | 2/1972 | Theodorsen | B29C 33/00 249/162 |
| 4,456,443 A | 6/1984 | Rabotski | 425/4 R |

(Continued)

FOREIGN PATENT DOCUMENTS

| | | |
|---|---|---|
| DE | 10 2009 028 987 | 4/2011 |
| GB | 884896 | 12/1961 |

(Continued)

*Primary Examiner* — Mary F Theisen
(74) *Attorney, Agent, or Firm* — James C. Lydon

(57) ABSTRACT

A method for manufacturing an insulation block, preferably an insulation plate, in which method the casting mold is adjusted to a desired size by moving at least one wall of the casting mold, the pre-expanded polystyrene, polypropylene or polyethylene beads are led to the casting mold, the pre-expanded polymer beads are steamed in the casting mold, and the formed finished insulation block is removed from the mold. In a method according to the invention at least one wall of the casting mold is moved during the steaming and/or during the cooling phase after the steaming.

3 Claims, 1 Drawing Sheet

(56) References Cited

U.S. PATENT DOCUMENTS

| | | | |
|---|---|---|---|
| 4,557,881 A | 12/1985 | Rabotski | 264/40.4 |
| 5,173,307 A * | 12/1992 | Nestle | B29B 13/10 249/134 |
| 6,235,806 B1 | 5/2001 | Ohgat et al. | 521/155 |
| 2011/0086216 A1 | 4/2011 | Lim et al. | 428/304.4 |

FOREIGN PATENT DOCUMENTS

| | | |
|---|---|---|
| GB | 2 096 616 | 10/1982 |
| KR | 2003-0073007 | 9/2003 |
| NO | 177681 | 7/1995 |

\* cited by examiner

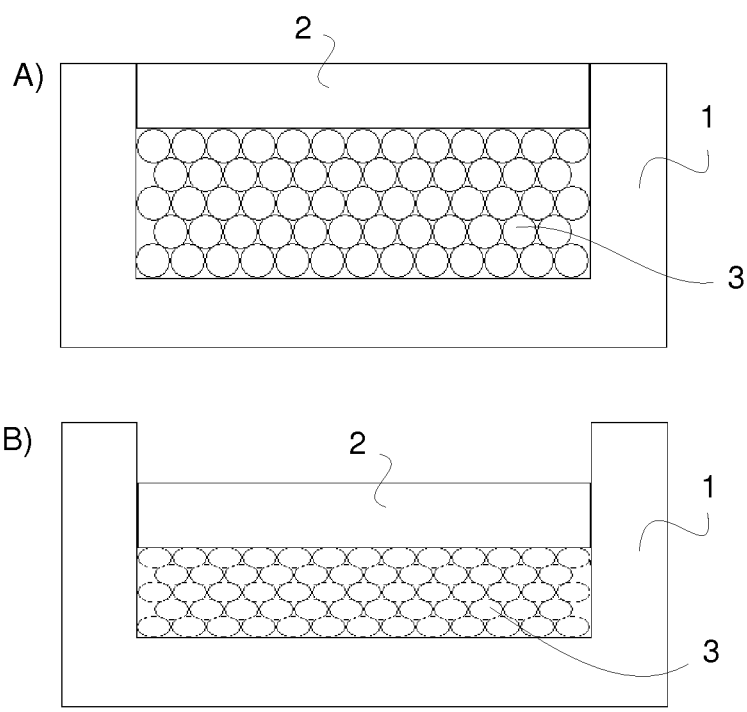

METHOD AND SYSTEM FOR MANUFACTURING INSULATION BLOCK AND INSULATION BLOCK

FIELD OF THE INVENTION

The invention relates to a method and system for manufacturing an insulation block and an insulation block according to the preambles of the enclosed independent claims.

BACKGROUND OF THE INVENTION

Expanded polymer insulation blocks, such as insulation plates (EPS plates) or the like manufactured from expanded polystyrene are typically manufactured by expanding pre-expanded polymer beads in a standard-sized mould, in which case the pre-expanded beads expand evenly in every direction. Thus, the structure of the cells in the finished expanded polymer block is round. The round shape of the cells gives standard properties to the insulation block in every direction of the block.

OBJECT AND DESCRIPTION OF THE INVENTION

The object of the present invention is to present a method for manufacturing insulation blocks, especially insulation plates, made of expanded polystyrene (EPS), expanded polypropylene (EPP) or expanded polyethylene (EPE), by which method the shape of the cells in the insulation block can be formed as desired and thus change the properties of the insulation block as desired.

The object of the invention is especially to present a method, by which a cell shape that is different from round can be achieved in the insulation block, which method enables the properties of the insulation block to be optimized differently measured from different directions of the insulation block.

To achieve this purpose, the invention is primarily characterized in what is presented in the characterizing parts of the independent claims.

The other, dependent claims present some preferred embodiments of the invention.

A typical method according to the invention for manufacturing an insulation block, preferably an insulation plate, from expanded polystyrene (EPS), expanded polypropylene (EPP) or expanded polyethylene (EPE), comprises at least the following steps:
  leading the pre-expanded polymer beads to the casting mould, which polymer beads are selected from a group including polystyrene, polypropylene and polyethylene, and which casting mould comprises a lower wall, side walls and an upper wall, which walls together delimit the inner volume of the casting mould,
  steaming the pre-expanded polymer beads in the casting mould,
  adjusting the casting mould to the desired size by moving at least one wall of the casting mould during the steaming and/or during the cooling phase after the steaming, and
  removing the formed insulation block from the mould.

A typical insulation block, preferably an insulation plate, according to the invention comprises parallel first and second large planar surfaces and parallel first and second long side edges and parallel first and second short side edges perpendicular to the long side edges, delimiting the surfaces.

A typical insulation block according to the invention is manufactured with the method according to the invention.

A typical system according to the invention for manufacturing an insulation block, preferably an insulation plate, from expanded polystyrene (EPS), expanded polypropylene (EPP) or expanded polyethylene (EPE), comprises at least
  a casting mould, which comprises a lower wall, side walls and an upper wall, which walls together delimit the inner volume of the casting mould, at least one wall comprising or forming the filling hole of the mould.
  means for producing the necessary temperature and/or pressure to the casting mould, and
  means arranged at least to one wall for moving the wall, preferably during the steaming and/or during the cooling phase after the steaming.

It has now been surprisingly found out that the shape of the cells of the insulation blocks, such as insulation plates, to be manufactured from expanded polystyrene (EPS), expanded polypropylene (EPP) or expanded polyethylene (EPE), can easily and simply be formed in the manufacturing stage of the insulation block by using a casting mould, which can be adjusted to the desired size by moving at least one of the walls of the casting mould. The method according to the invention makes it possible to control and form the shape of the cells in the insulation block as desired, and thus the properties of the insulation block, such as thermal conductivity, compression strength, bending strength and dimensional stability, can be affected. With the method according to the invention the insulation properties can be made different when measured from the different directions of the insulation block. The dimension stability of the insulation plates according to the invention has been found good in the longitudinal and lateral direction of the plates.

In a preferred embodiment of the invention the inner volume of the casting mould is adjusted during the steaming phase and/or during the cooling phase after the steaming before removing the finished insulation block, such as insulation plate, from the mould. In a method according to the invention especially the steaming of the polymer beads is essential so that the polymer beads are completely soft, i.e. elastic before at least one wall of the casting mould is moved. Thus, the shape of all polymer beads and the shape of their cells in the insulation plate can be formed by moving at least one wall of the casting mould so that the inner volume of the casting mould decreases or increases. The temperature range and thus the steaming temperature used in the method, in which steaming temperature the polymer beads are elastic, depend on the polymer used.

In a preferred embodiment of the invention the pre-expanded polymer beads are preheated before leading them into the casting mould or before the actual steaming phase. Thus, it can be ascertained that the polymer beads are sufficiently elastic and the shape of all cells, also in the middle of the polymer beads, can be formed when changing the inner volume of the casting mould in the steaming phase. Polymer beads can be led from the pre-expansion directly to the steaming phase without intermediate storing.

In a method according to the invention the pre-expanded polymer beads are steamed in the casting mould. This means that in the steaming phase steam is led to the casting mould, as a consequence of which the polymer beads can be made elastic, but at the same time the polymer beads can also be expanded due to the effect of the steam. In a typical method according to the invention the casting mould is filled with pre-expanded polymer beads so that the polymer beads substantially fill the entire inner volume of the casting mould. If the polymer beads don't fill the entire inner volume of the casting mould, the polymer beads can also be expanded in the steaming phase. The steaming phase according to the invention thus comprises also expanding of the polymer beads in the casting mould.

In a preferred embodiment of the invention the inner volume of the casting mould is changed so that the inner volume of the casting mould decreases. The adjustment of the inner volume can be realised by moving at least one wall of the casting mould. In a preferred embodiment of the invention at least one wall is moved so that the inner volume of the casting mould decreases in the entire area of the casting mould, i.e. the insulation block, such as insulation plate, to be formed is compressed with the aid of the wall or walls of the casting mould. Typically, a wall of the casting mould is moved, which wall delimits the inner volume of the casting mould in the area of the planar surfaces of the insulation block, but also, when necessary, at least one of its walls can be moved, which wall delimits the side edges of the insulation block. In an embodiment at least one wall of the casting mould is moved, which wall delimits the side edges of the insulation block. In a preferred embodiment the movable wall is typically the upper or the lower wall, which delimits the inner volume of the casting mould in the area of the planar surfaces of the insulation block and thus their moving affects to the thickness of the insulation block to be manufactured in the entire area of the insulation block. Preferably, the inner volume of the casting mould decreases equally in the entire area of the casting mould, i.e. the polymer beads in the casting mould are compressed and the thickness of the insulation block to be formed in this way decreases equally in the entire area of the block. Walls, for example the upper and lower wall, of the casting mould delimiting both planar surfaces of the insulation blocks, can be moved simultaneously.

In a preferred embodiment the insulation block to be formed is compressed during the steaming, preferably in the final stage of the steaming. In an embodiment at least one wall of the casting mould is moved at the time of the steaming and the middle of the cooling phase after the steaming. Typically, the compression is performed at the time between the middle of the steaming and the middle of the cooling phase after the steaming, i.e. in the period of time of about 50% before the end of the steaming phase and about 50% from the beginning of the cooling phase after the steaming. In a preferred embodiment the compression phase of the insulation block is arranged to the period of time which is about 25% before the end of the steaming phase and about 25% from the beginning of the cooling phase after the steaming. In a method according to the invention the compression phase is thus performed when the polymer beads are elastic, since at that point the forming of the cell shape by compressing to a desired shape, i.e. typically from round cells to elongated cells, is possible without breaking the cells. In the cooling phase of the method according to the invention the polymer beads are cooled down and hardened to the shape, to which they are forced in the steaming phase. The cooling phase is typically performed in a casting mould so that the wall, which has been moved in the steaming and/or cooling phase, is during the cooling of the insulation block in the position, to which it was moved. Thus, with the method according to the invention the properties of the insulation block to be formed can easily and simply be changed as desired, for example to enhance its heat insulation property or compression strength in the desired direction of the block. The cells of the insulation block to be formed remain, however, at least mainly, unbroken, wherein the typical properties of the insulation block, such as for example air- and waterproofness, don't suffer significantly.

The wall of the casting mould is typically moved 0.1 to 70%, more typically 2 to 50%, and even more typically 10 to 40% or 10 to 25% of the length of the wall delimiting the inner volume of the casting mould, which wall is substantially perpendicular to the movable wall, when the inner volume of the casting mould is decreased. For example, when the movable wall is the upper wall of the casting mould, the upper wall is typically lowered 0.1 to 70%, more typically 2 to 50%, and even more typically 10 to 40% or 10 to 25% of the height of the side walls delimiting the casting mould.

In an embodiment the upper wall of the casting mould is moved downwards in the final stage of the steaming and/or in the cooling phase after the steaming so that the compression is substantially directed to the entire area of the movable wall, and which upper wall substantially delimits the entire planar surface of the insulation block to be formed. Thus, the cells of the insulation block to be formed can be formed substantially elongated, i.e. oval, in the entire area of the insulation block due to the force directed downwards. Respectively, the compression can be performed by moving the lower wall of the casting mould or simultaneously the upper and lower wall. In an insulation block according to the invention the number of the polymer beads between the planar surfaces of the block remains substantially the same in the compression phase, only the shape of the cells of the polymer beads changes. The elongated cells enhance the insulation property of the block in the compression direction, i.e. in the direction perpendicular to the largest diameter of the cells. The maximum diameter of the elongated cells is typically 0.01 to 0.6 mm, most typically 0.05 to 0.3 mm. Respectively, the maximum diameter of the polymer beads is about 0.5 to 2 cm. The thermal conductivity of the insulation block comprising elongated cells perpendicular to the large surfaces is typically 0.026 to 0.033 W/K·m, more typically 0.027 to 0.030 W/K·m, i.e. its insulation property is good. The compression strength of such insulation plate comprising elongated cells weakens in the compression direction of the plate, but gets better in the direction perpendicular to the compression. An insulation block, preferably an insulation plate, according to an embodiment of the invention comprises thus a first and second parallel large planar surface and first and second parallel long side edges and parallel first and second short side edges perpendicular to the long side edges, delimiting the surfaces, and the cells of the insulation block are mainly elongated and directed parallel to the large surfaces of the block substantially in the entire insulation block, i.e. the longitudinal direction of the elongated cells is parallel to the large planar surfaces.

In another embodiment of the invention at least one wall of the casting mould is moved during the steaming so that the inner volume of the casting mould increases. Typically, the casting mould is filled before the steaming phase so that the polymer beads substantially fill the entire inner volume of the casting mould. The inner volume of the casting mould is preferably formed when there is underpressure in the casting mould, i.e. before the beginning of the cooling phase after the steaming phase and before the overpressurization of the mould after the steaming. Typically, the walls of the casting mould, which walls delimit the planar surfaces of the insulation block to be formed, are moved so that the inner volume of the casting mould increases. Typically, the wall of the casting mould is moved 0.1 to 20%, and more typically 1 to 15%, of the length of the wall of the casting mould delimiting the inner volume, which wall is substantially perpendicular to the movable wall, so that the inner volume can be increased. The polymer beads have thus room to expand in the casting mould due to the effect of the steam. At least one wall of the casting mould, which wall delimits the inner volume of the casting mould in the area of the long side edge or short side edge of the insulation block, can be moved simultaneously so that the inner volume of the casting mould between the side edges decreases, whereby the cells are forced to be shaped in the certain direction. Elastic polymer beads are thus simultaneously steamed and expanded with the aid of the steam as well as compressed. The compression of the insulation block can also be performed alone, but forming the shape of the cells is easier when the compression is combined with the increase of the inner volume to be made in underpressure by moving the planar surfaces of the block. This way the cells in the insulation block can be shaped elongated, i.e. oval, in the entire area of the insulation block so that the longitudinal direction of the elongated cells is substantially perpendicular to the large planar surfaces of the insulation block. This way the compression strength of the insulation block, such as insulation plate, can be enhanced in the direction perpendicular to the large surfaces of the insulation block. The maximum diameter of the elongated cells is the same as when compressing the insulation block.

At least one wall of the casting mould can be adjusted continuously for example by arranging to the movable wall appropriate means for moving the wall, with the aid of which means moving of the wall is easy also during steaming.

The thickness of the formed insulation block, i.e. the distance of the large surfaces from each other is typically 20 to 600 mm, more typically 50 to 400 mm. The insulation block is preferably plate-like, the length of the long side edge of which is typically 600 to 6000 mm, more typically 1000 to 3000 mm, even more typically 1200 to 2600 mm. The length of the short side edge is typically 300 to 1500 mm, more typically 500 to 1300 mm, even more typically 600 to 1200 mm.

The polymer beads of the invention are selected from the group including polystyrene, polypropylene and polyethylene. In a preferred embodiment of the invention the pre-expanded polymer beads are of polystyrene and the insulation plate to be formed is a block formed of expanded polystyrene (EPS plate).

The casting mould is typically manufactured from steel or similar material, and it comprises a lower wall, side walls and an upper wall. In a preferred embodiment of the invention the upper and lower wall of the casting mould delimit the planar surfaces of the insulation block, and the side walls delimit the long and short side edges of the insulation block. The walls delimit the inner volume of the casting mould, to which the pre-expanded polymer beads are led. The polymer beads can be led to the inner volume of the casting mould through a filling hole arranged to the wall or alternatively one of the walls, typically the upper wall, of the mould can be entirely or partially removed during the filling of the mould. With the steaming means of the system the necessary temperature and/or pressure is generated to the inner volume of the casting mould, whereby the polymer beads are changed elastic and fill the inner volume of the mould evenly in every direction. With the steaming means for example steam can be led into the mould. In the beginning of the steaming phase the cells are round or almost round, and they change their shape when at least one of the walls of the casting mould is moved so that the inner volume of the casting mould changes. In an embodiment of the invention the casting mould system also comprises means for preheating the polymer beads and leading the preheated polymer beads to the casting mould.

The parallel first and/or second planar surface of the insulation block, such as insulation plate, according to the invention can comprise for example grooves, or the surfaces can be flat. The long and/or short side edges of the insulation block, preferably insulation plate, can comprise shapes that enable tongue-and-groove joint or other similar shapings. The method and system of the invention can be applied for example in the manufacture of insulation bars.

The polymer insulations according to the invention are mainly used in the thermal insulation of buildings, but they are also suitable as, for example, road or yard area lighteners. The insulation plate according to the invention can also be used for example as a plaster surface in the construction.

BRIEF DESCRIPTION OF THE DRAWINGS

In the following the invention will be described in more detail by referring to FIG. 1A and FIG. 1B, which show in schematic views a method according to an embodiment of the invention for manufacturing an insulation block, such as an insulation plate.

FIGS. 1A and 1B show a method according to the invention in two stages. In stage A, shown in FIG. 1A, pre-expanded polymer beads 3 are arranged into the casting mould 1, which casting mould comprises a movable upper wall 2. The polymer beads 3 substantially fill the entire inner volume of the casting mould. In stage B, shown in FIG. 1B, the polymer beads are steamed in the mould 1 and the movable upper wall 2 of the casting mould 1 is pressed downwards in the steaming phase and/or during the cooling phase after the steaming phase, as a consequence of which an insulation block comprising mainly elongated polymer beads and cells 3 can be formed. The formed insulation block is cooled down in the casting mould 1 so that the movable upper wall 2 is still in the position, to which it was moved during the steaming phase and/or during the cooling phase following it.

EXAMPLE

With a method according to the invention insulation plates were manufactured so that the casting mould was filled with polymer beads so that the polymer beads substantially filled the entire inner volume of the casting mould, and after that the polymer beads were steamed in the casting mould. In the steaming phase the upper wall of the casting mould was moved downwards, whereby the insulation plate to be formed was compressed. The thermal conductivity ($\lambda_{10}$) was measured from the insulation plates formed. Polystyrene Ineos Nova Silver (density 18 kg/m$^3$) was used as a raw material in the insulation plates.

| Thickness of the plate (mm) | Compression in the steaming phase % | Thermal conductivity $\lambda_{10}$ (W/K · m) |
| --- | --- | --- |
| 100 | 0 | 0.030 |
| 80 | 20 | 0.0285 |
| 70 | 30 | 0.0275 |

The thermal conductivity of the compressed plates decreases compared to the uncompressed plate, so the thermal conductivity of the insulation plates according to the invention is better.

The invention is not intended to be limited to the above-presented exemplary embodiments, but the intention is to apply the invention widely within the inventive idea delimited by the claims delimited below.

The invention claimed is:

1. A method for manufacturing an insulation block which comprises parallel first and second large planar surfaces and parallel first and second long side edges and parallel first and second short side edges perpendicular to the long side edges, delimiting the surfaces, said method comprising
   placing pre-expanded polymer beads into the casting mould, wherein said polymer beads are selected from the group consisting of polystyrene, polypropylene and polyethylene, and wherein said casting mould comprises a lower wall, side walls and an upper wall, which walls together delimit an inner volume of the casting mould, wherein at least one wall is movable,
   steaming and expanding said pre-expanded polymer beads in the casting mould to produce a formed insulation block,
   cooling said formed insulation block, and
   removing said formed insulation block from the mold,
   wherein said polymer beads and their cells are formed into an elongated shape and are directed parallel to the large planar surfaces of the insulation block substantially in the entire insulation block by moving at least one movable wall of the casting mould at a time between a middle of the steaming phase and a middle of the cooling phase after the steaming phase,
   wherein the movable wall is moved 10 to 40% of a length of a wall which is substantially perpendicular to the movable wall, so that the inner volume of the casting mould decreases in an entire area of the casting mould.

2. A method according to claim 1, wherein the pre-expanded polymer beads are preheated before placing them into the casting mould.

3. A method according to claim 1, wherein at least one wall of the casting mould is moved during a period of time which is about 25% before the end of the steaming phase and about 25% from the beginning of the cooling phase after the steaming phase.

* * * * *